Patented May 30, 1933

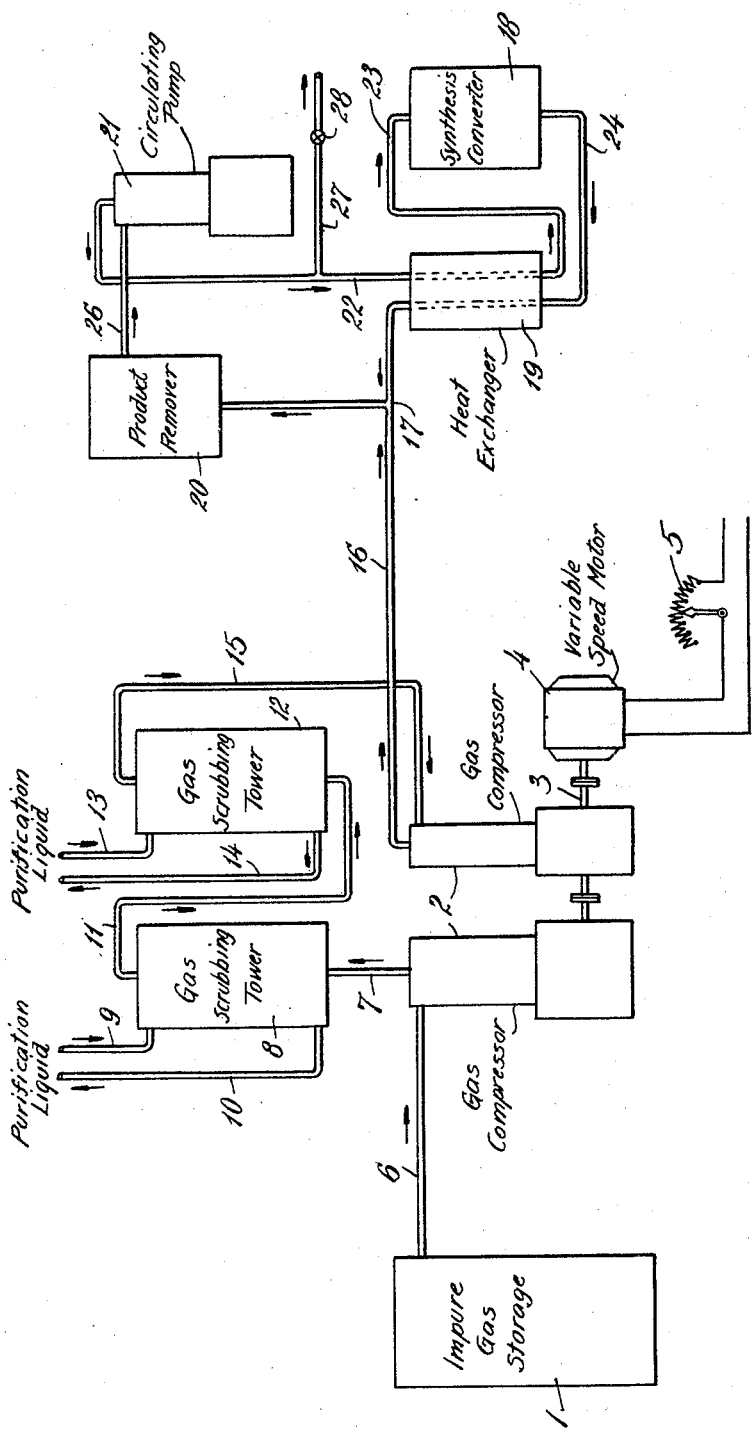

1,911,353

UNITED STATES PATENT OFFICE

JOHN W. DAVIS, OF PRINCE GEORGE COUNTY, VIRGINIA, ASSIGNOR TO ATMOSPHERIC NITROGEN CORPORATION, OF NEW YORK, N. Y., A CORPORATION OF NEW YORK

CATALYTIC PROCESS

Application filed May 20, 1931. Serial No. 538,732.

This invention relates to a process for the synthetic production of compounds by catalysis of gases. More particularly, the invention relates to a method of temperature control for catalytic gaseous reactions.

Numerous processes are known in which compounds are synthesized by passing a gas in contact with a catalyst active to promote the reaction of the gas to form the desired compounds. For an efficient economical operation of the catalyst, it is desirable to maintain the temperature of the reacting materials in contact therewith at comparatively specific temperatures since the activity of catalytic material is, in general, quite susceptible to variations in the temperature of operation of the catalyst. Many catalytic synthetic reactions, as for example, the synthesis of ammonia from a mixture of nitrogen and hydrogen gases, involve passing the gas in contact with the catalyst at elevated temperatures and pressures.

In the commercial production of compounds by synthesis from their components, the temperature of the reactants undergoing catalysis and hence of the catalyst itself depends upon numerous factors in the operation of the synthesis process. Among these may be noted the amount of heating from an external source of the materials prior to passing in contact with the catalyst and the thermal changes which take place as a result of the synthesis reaction itself which may either liberate or absorb heat in the system. The amount of the thermal change caused by the latter of these two factors varies with the degree of reaction taking place in contact with the catalyst. This, in turn, is influenced by numerous factors such as the purity of the reactants, the rate with which they are passed over the catalyst, etc. These conditions of operation of the synthesis process vary from time to time and tend to cause variations in the temperature of the reaction which requires that provision be made for counteracting the tendency of the reaction temperature to increase or decrease during the conduct of the process.

I have discovered that the thermal conditions of a synthesis process wherein gases are catalyzed may simply and continuously be maintained substantially constant by changing the pressure upon the reacting gases to counteract the changes in conditions in the synthesis system which would otherwise cause variations in the reaction temperature. Thus, I have discovered that changes in the temperature of a reaction mixture of gases in contact with a catalyst over which it is passed for the synthesis of compounds therefrom, may be controlled and counteracted by varying the pressure upon the reaction mixture itself. The practical application of my discovery is of particular importance in the conduct of a gas synthesis process such as an ammonia synthesis process wherein a mixture of nitrogen and hydrogen is heated by transfer to the gas mixture of heat generated by the reaction to form ammonia and the thus heated gases are contacted at an elevated pressure with an ammonia synthesis catalyst. In such a process the regular thermal conduct of the same may be particularly effectively attained by varying the pressure upon the gases undergoing catalysis despite the tendency of changing conditions in the synthesis system to effect variations in the reaction temperature. Furthermore, in those cases where the gas to be treated is subjected under pressure to purification treatment with liquids prior to introduction into the synthesis system itself to remove impurities which are absorbed in the liquids, I have found it particularly desirable, in employing my new method of control of the reaction temperature, to operate the synthesis system at a materially higher pressure than that employed for the antecedent treatment with liquid absorbents of the gases to be synthesized. By operating in this manner the requisite changes in pressure in the synthesis system to maintain the desired uniformity of reaction temperature may be made without detrimentally affecting the purification system by changing the pressure therein.

For a fuller understanding of the nature and objects of the invention, reference should be had to the following detailed description of an ammonia synthesis process taken in connection with the accompanying drawing which diagrammatically indicates an ammonia synthesis system suitable for carrying out the process of this invention.

Referring to the drawing, the numeral 1 indicates a gas storage vessel for the storage of an impure mixture of nitrogen and hydrogen gases which preferably contains the nitrogen and hydrogen in the proportions by volume of 1:3. This gas mixture may be produced, for example, by the gasification of coke with steam and air followed by decomposition of the major proportion of the CO formed with water to produce additional hydrogen. The impure gas in storage vessel 1 may contain a relatively large proportion of carbon dioxide and smaller proportions of undecomposed carbon monoxide and other impurities. The numeral 2 indicates a multi-stage gas compressor which is driven through a shaft 3 by a variable speed electric motor 4. A rheostat 5 is provided for varying the speed of motor 4 and this, in turn, varies the rate of operation of gas compressor 2. The impure gas from storage vessel 1 is drawn through a line 6 to the low pressure stage or stages of compressor 2, where it is compressed and passed through a pipe 7 into the bottom of a gas scrubbing tower 8. Gas scrubbing tower 8 is supplied with water from a pipe 9 which is introduced under pressure into the top of tower 8 and flows downwardly through the tower in contact with gas from pipe 7 rising through the tower. The water acts to absorb carbon dioxide from the gas and the water containing carbon dioxide leaves tower 8 through a pipe 10.

The gas thus treated in tower 8 for removal of carbon dioxide leaves the tower through a pipe 11 and is passed to a second gas scrubbing tower 12 where it is treated with an ammoniacal cuprous solution introduced into the top of tower 12 from pipe 13. The cuprous solution absorbs carbon monoxide from the gas and is withdrawn from the tower through pipe 14. Both of the towers 8 and 12 preferably contain a packing which serves to intimately contact the gas and liquid passing therethrough.

The gas from which carbon dioxide and carbon monoxide have been removed in towers 8 and 12 is passed through a pipe 15 to the high pressure stage or stages of gas compressor 2 where it is compressed to a materially higher pressure than it was under during its passage through the purification treatment carried out in the two gas scrubbing towers. The thus compressed gas is passed through a pipe 16 and at 17 is introduced into a recirculatory ammonia synthesis system.

The ammonia synthesis system may comprise a synthesis converter 18, a heat exchanger 19, an ammonia product remover 20 and a circulating pump 21. In this system, the nitrogen-hydrogen gas is recirculated by means of pump 21 through a pipe 22 to heat exchanger 19 and thence through pipe 23 to synthesis converter 18. The catalyzed gas leaves converter 18 through a pipe 24 and passes through heat exchanger 19 in indirect heat exchange relationship with the gas from pipe 20 passing on its way to contact with an ammonia catalyst in converter 18, thus serving to heat this gas to an elevated temperature. Converter 18 may also if desired, comprise a heat exchanger and is preferably of the type in which the gas passing on its way to direct contact with the catalyst is passed through the catalyst and in heat exchange relation therewith prior to passing in direct contact with the catalyst. From heat exchanger 19, the catalyzed gas passes through pipe 25 receiving an addition of fresh gas from pipe 16 and enters product remover 20 where ammonia synthesized in converter 18 is removed from the gases prior to their recirculation through a pipe 26 and pump 21 back through heat exchanger 19 and synthesis converter 18. Product remover 20 is preferably a refrigerator for the gases to cool them to a low temperature at which the ammonia gas condenses as a liquid. By removing the synthesized product as liquid ammonia and introducing the fresh gas from pipe 16 into the gases recirculating in the synthesis system prior to their refrigeration for removal of liquid ammonia product therefrom, a purification of the fresh incoming gas takes place in product remover 20 by contacting the fresh gas with the liquid ammonia formed therein. A pipe 27 with valve 28 is provided whereby a portion of the gas recirculating in the synthesis system may be withdrawn therefrom as may be desired to remove from the system accumulating inert gases introduced with the fresh make-up gas from pipe 16.

In carrying out the process of this invention employing the apparatus described above and shown in the drawing, changes in temperature in the gas in contact with the catalyst in converter 18 due to variations in operating conditions of the gas recirculatory synthesis system such as the rate of recirculation of the gases therein, the transfer of heat in heat exchanger 19, variations in the purity of the gases introduced into contact with the catalyst, etc. are compensated for, and counteracted by changing the pressure upon the gases in the synthesis system itself. In the apparatus illustrated, this change in pressure may be induced by changing the rate of operation of gas compressor 2 by means of rheostat 5. For example, if the temperature in converter 18 tends to rise, the setting of rheostat 5 is changed to cause gas compressor 2 to pump a smaller amount of gas into the synthesis system than theretofore. The pressure in the synthesis system is thereby lowered, which serves to counteract the effect of those conditions in the system tending to increase the temperature in the converter and to thus repress any rise in converter temperature. Conversely, if the temperature in the synthesis converter tends to drop, the rate of operation of gas compressor 2 is increased thus increasing the pressure of the gas in the synthesis system and serving to repress the change in temperature in converter 18.

This control of converter temperature is accomplished without changing the pressure in the gas purification system comprising towers 8 and 12. The pressure in the purification system is primarily dependent upon the proportions between the effective volumes of the stages of the compressor which serve to introduce gas into that system and the stages of the gas compressor through which gas is withdrawn therefrom and, as is well known in the gas compressor art, is independent of the rate of operation of the compressor. It is thus apparent that an important advantage of the invention as described above and illustrated in the drawing arises from the fact that by operating the synthesis system at a materially higher pressure than the purification system, a control of the synthesis reaction temperature may be accomplished by changing the pressure in the synthesis system without upsetting the efficiency of the gas purification system wherein the purification of the gas by means of liquid absorbents is substantially completed, by variations in the pressure at which the gas is treated with the purification liquids. Since a high degree of purity of gases is of particular importance in the conduct of catalytic synthetic processes, this feature of the invention is of prime practical importance.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

I claim:

1. In a process for the synthetic production of compounds wherein a reaction mixture of gases is contacted with a catalyst that improvement which comprises counteracting changes in the conditions of carrying out said synthesis which tend to vary the temperature of the reaction mixture in contact with the catalyst by altering the pressure upon said gas.

2. In a process for the synthetic production of compounds wherein a reaction mixture of gases is passed at an elevated pressure in contact with a catalyst and said reaction mixture is heated by transfer thereto of heat liberated by reaction of said gases in contact with the catalyst, that improvement which comprises repressing changes in the temperature of the reaction mixture in contact with the catalyst by altering the pressure upon said gas.

3. In a process for the synthesis of ammonia wherein a gas containing hydrogen and nitrogen is passed at an elevated pressure and temperature in contact with an ammonia synthesis catalyst, that improvement which comprises repressing changes in the temperature of the gas in contact with the catalyst by altering the pressure upon said gas.

4. The process for the synthesis of ammonia which comprises passing a gas containing nitrogen and hydrogen at an elevated pressure in contact with an ammonia synthesis catalyst, heating said gas to an elevated temperature prior to contact with the catalyst by transfer thereto of heat liberated by the reaction of nitrogen and hydrogen contained in the gas to form ammonia, and repressing changes in the temperature of the gas in contact with the catalyst by altering the pressure upon said gas.

5. The process for the synthesis of ammonia from a nitrogen-hydrogen gas containing impurities which comprises placing said gas under pressure and at said pressure passing the impure gas in contact with a liquid wherein impurities contained in the gas are absorbed, compressing the thus purified gas, passing the compressed gas into an ammonia synthesis system operating at a pressure materially above the aforementioned pressure of purification wherein the gas is contacted with an ammonia synthesis catalyst at an elevated temperature, and repressing a change in the temperature of the gas in contact with said catalyst by altering the pressure upon said gas.

6. The process for the synthesis of ammonia from a nitrogen-hydrogen gas containing impurities which comprises placing said gas under pressure and at said pressure passing the gas through a series of purification treatments for the removal of the major proportion of said impurities by contact with liquids wherein the impurities are absorbed, compressing the thus purified gas to a materially higher pressure, introducing the compressed gas into an ammonia synthesis system wherein the gas is passed in contact with a catalyst at an elevated temperature and heated prior to said contact by heat exchange with the gas leaving the catalyst, repressing a change in the temperature of the gas in contact with the catalyst by altering the pressure upon said gas and during the aforesaid operations maintaining substantially constant the pressure upon the impure gas undergoing said purification treatment.

7. The process for the synthesis of ammonia from a nitrogen-hydrogen gas containing impurities which comprises placing said gas under pressure and at said pressure passing the gas through a series of purification treatments for the removal of the major proportion of said impurities by contact with liquids wherein the impurities are absorbed, compressing the thus purified gas to a materially higher pressure, introducing the compressed gas into a recirculatory ammonia synthesis system wherein the gas is circulated in contact with a catalyst at an elevated temperature and heated prior to said contact by heat exchange with gas leaving the catalyst, repressing a change in the temperature of the gas in contact with the catalyst by altering the rate at which said compressed purified gas is introduced into the synthesis system whereby the pressure of the gas in said system is altered and during the aforesaid operations maintaining substantially constant the pressure upon the impure gas undergoing said purification treatment.

JOHN W. DAVIS.